Aug. 13, 1940.   C. J. BROWN   2,211,317
CONTROLLER DEVIATION RECORDER
Filed July 16, 1937   2 Sheets-Sheet 2
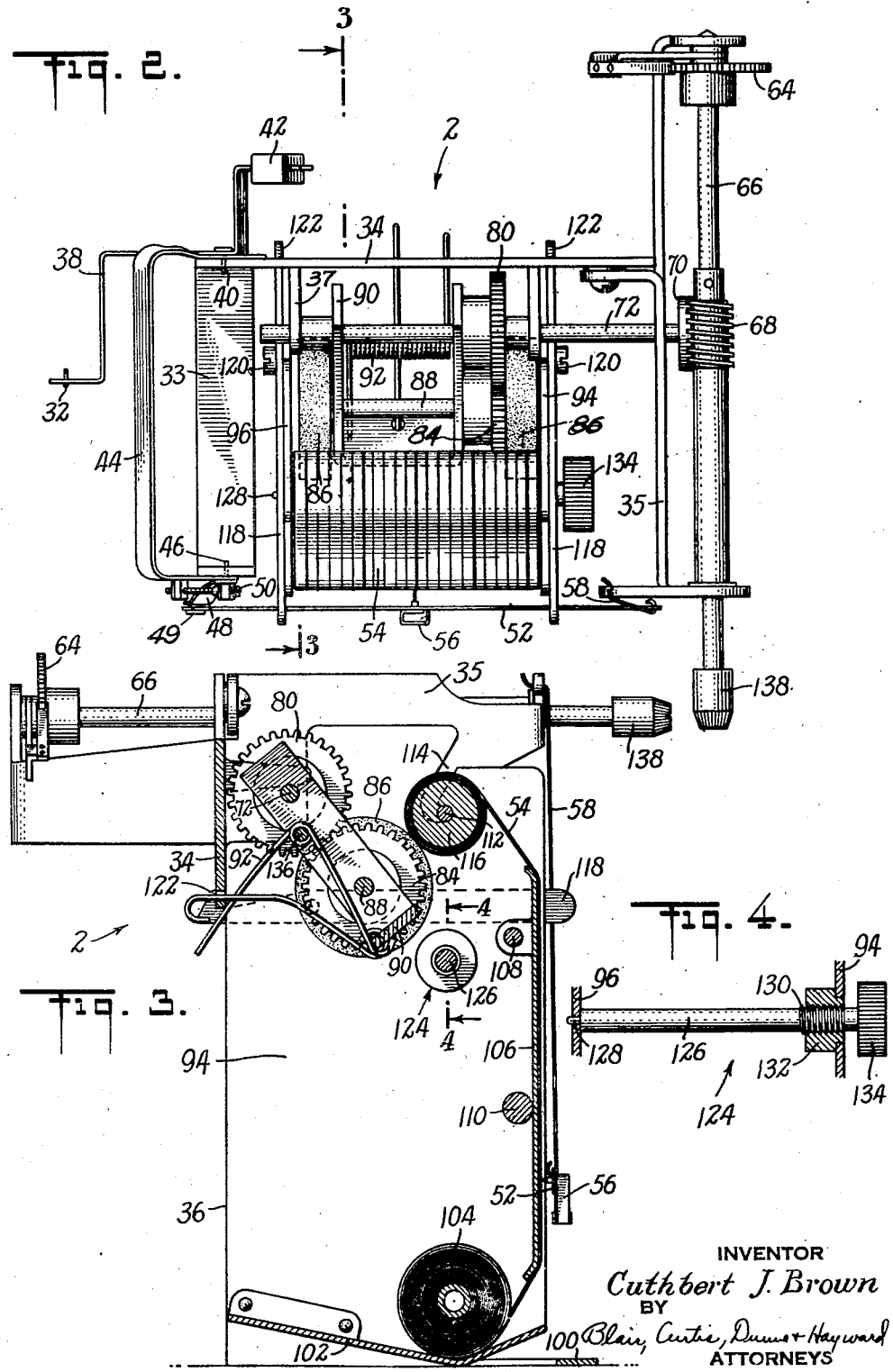
INVENTOR
Cuthbert J. Brown
BY
Blair, Curtis, Dunne & Hayward
ATTORNEYS Patented Aug. 13, 1940

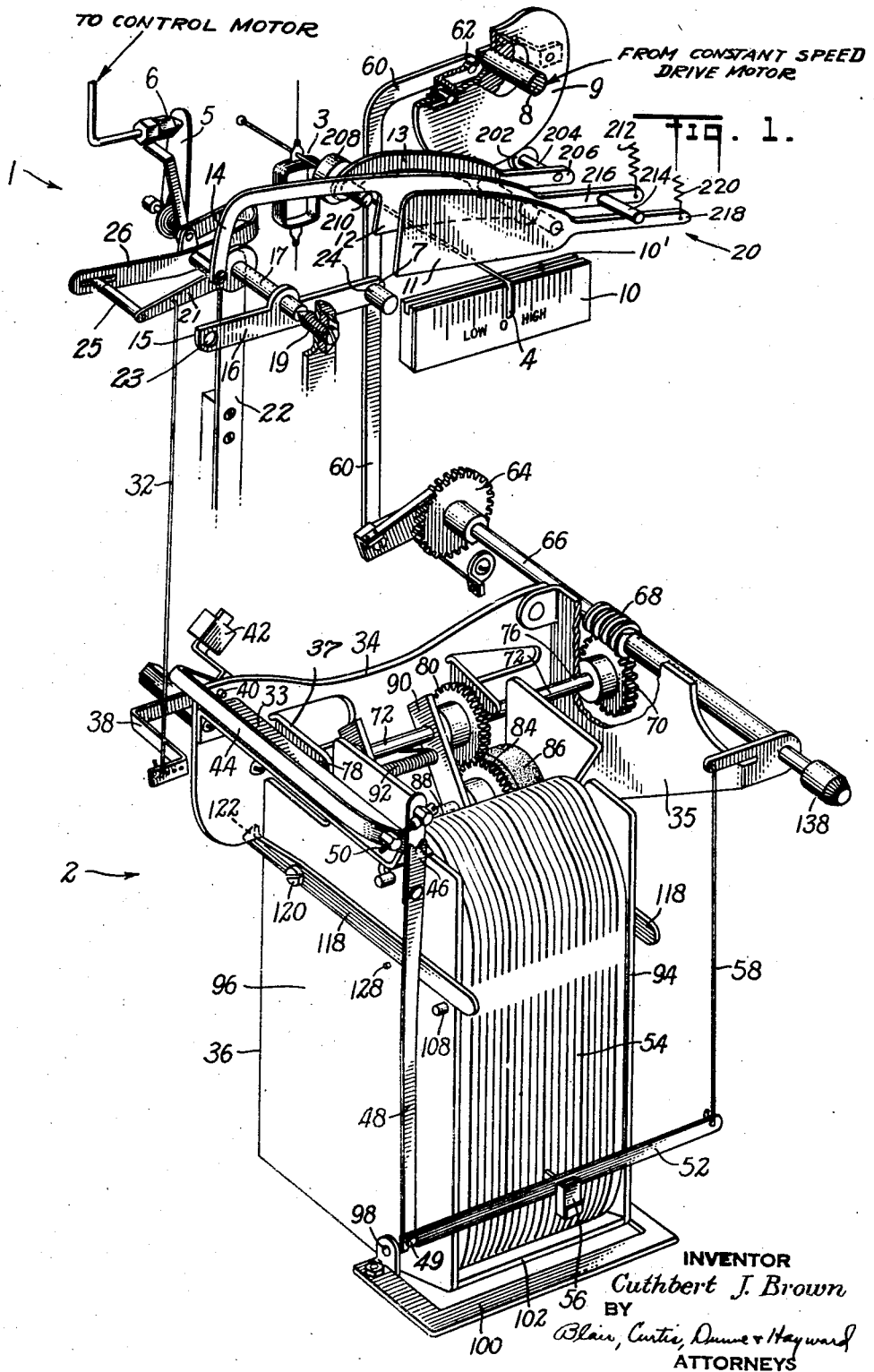

2,211,317

UNITED STATES PATENT OFFICE 2,211,317

CONTROLLER DEVIATION RECORDER

Cuthbert J. Brown, Foxboro, Mass., assignor to The Foxboro Company, Foxboro, Mass., a corporation of Massachusetts Application July 16, 1937, Serial No. 153,965

4 Claims. (Cl. 234—70)

This invention relates to apparatus for controlling a condition, and more particularly to apparatus associated with such a controller for recording the deviation of the condition from a predetermined value.

In the past in the art of controlling and recording variations in a condition, such for example, as temperature, it has been found desirable to accomplish these results with separate instruments in order that each instrument might be designed to do its particular task with the utmost efficiency. Attempts to combine these functions into one instrument have been generally unsatisfactory, either the accuracy of the record or the range and sensitivity of the control suffering by the combination. It is desirable, however, for the satisfactory operation of a controller to have a record of the control affected thereby so that adjustments to the control device may be made intelligently, and it is important that the apparatus for producing such a record does not interfere with the controlling operation.

Accordingly, it is an object of this invention to provide apparatus for recording the control obtained by a controller, which apparatus does not interfere with the operation of the controller.

This, and other apparent objects and advantages are obtained by the means described in the following specification, and may be more readily understood by reference to the accompanying drawings in which:

Figure 1 illustrates in perspective an embodiment of the invention;

Figure 2 is a plan view of the recording portion of the apparatus shown in Figure 1;

Figure 3 is a vertical section on line 3—3 of Figure 2; and

Figure 4 is a vertical section of a frame adjustment member taken on line 4—4 of Figure 3.

Referring to Figure 1, a portion of a controller mechanism is generally indicated at 1, and a recorder mechanism for recording the deviation from a predetermined value of the condition affected by controller 1 is generally indicated at 2. A galvanometer or meter element 3 responsive to the value of a condition, such as temperature, is suitably connected to an electrical condition responsive circuit (not shown) which is so adjusted that the galvanometer pointer 4 is at the zero point of a suitable scale 10 when the condition is at the desired value. Variations of the condition cause the pointer 4 to move over scale 10. The position of the pointer 4 is transmitted through a suitable feeler mechanism, such for example as that described in the U. S. patent application No. 281,626 to C. E. Mason et al., which is more or less diagrammatically illustrated at 20, to position a rocker arm 16 attached to a shaft 17 in a rotational position corresponding to the position of the galvanometer needle 4 with respect to scale 10. The angular position of shaft 17 determines the position of a flapper member 5 of a pneumatic control couple 6, such as shown in the above mentioned patent application and in the U. S. Reissue Patent No. 20,092 to C. E. Mason, and the pneumatic couple 6 together with other mechanism not here shown but disclosed in said reissue patent operate a suitable pneumatic motor adapted to control an agent influencing the condition affecting pointer 4. This control couple 6 and its associated control mechanism is preferably made sensitive to slight changes in the position of the pointer 4 and thus to slight changes in the value of the condition being controlled.

The feeler mechanism 20 is so designed as to cause the position of rocker arm 16 and flapper 5 to follow closely the position of pointer 4. The feeler mechanism more or less diagrammatically illustrated at 20 is driven by a constant speed motor (not shown) which drives a shaft 8 rotating a cam 9 attached thereto. Cam 9, through suitable mechanism operates a series of members 11, 12, and 13 of the feeler mechanism 20 to periodically position the rocker arm 16 in an angular position corresponding to the position of pointer 4. The members 11, 12, and 13, which may be termed a "clamping" member, a "detector" member, and a "depressor" member, respectively, are each rotatably mounted on a shaft 18. A cam follower 202 is rotatably mounted on a pin 204 secured to an extension 206 of the depressor member 13 extending to the right of shaft 18. A weight 208 on the left-hand end of member 13 holds cam follower 202 in continuous contact with the cam surface of cam 9 so that the member 13 is periodically oscillated up and down as the cam 9 rotates. A pin 210 projects from the left-hand end of member 13 under the left-hand end 14 of detector member 12. As member 13 moves upward, pin 210 picks up member 12 and carries it along, thus imparting a corresponding motion to member 12. Member 12 is biased by a spring 212 so that its left-hand end 14 is normally urged downwardly to contact pin 210 on member 13. A pin 214 is secured to an extension 216 on the right-hand end of member 12 and projects into the path of an extension 218 on the right-hand end of clamping member 11. A spring 220 is provided to normally hold extension 218 of member 11 against pin 214. In operation, as cam 9 rotates, and cam follower 202 approaches its lowermost position, member 13 rotates in a clockwise direction until pin 210 picks up member 12. Member 13 continues its clockwise rotation carrying member 12 along with it until pin 214 contacts extension 218 of member 11, thus imparting to member 11 a clockwise motion so that all three members 11, 12, and 13 move to the limit of their clockwise travel. As cam follower 202 passes its lowermost position and starts to rise, members 11, 12, and 13 rotate in a counterclockwise direction so that their left-hand ends descend. As they descend, clamping member 11 contacts pointer 4 and clamps it against an anvil 10' horizontally disposed behind the scale 10. Pin 214 then leaves extension 218 of member 11, and members 12 and 13 continue to descend until the motion of detector member 12, which has a calibrated curved contacting edge on its underside, is arrested by contacting pointer 4. The curved lower edge of member 12 causes it to assume an angular position about shaft 18 which corresponds to the position of pointer 4 with respect to scale 10 and its left-hand end 14 assumes a vertical position which is in proportional correspondence to the horizontal position of pointer 4 with respect to scale 10. If, in assuming this vertical position, the end 14 of member 12 contacts the left-hand end 15 of rocker arm 16, it carries end 15 with it to the extreme of its motion, thus causing shaft 17 to rotate and assume an angular position corresponding proportionally to the position of pointer 4. If the left-hand end 14 of member 12 does not contact end 15 of rocker arm 16, then depressor member 13, which continues to descend after the motion of detector member 12 is arrested by contacting pointer 4, contacts the right-hand end 7 of rocker arm 16 and forces it downwardly until the left-hand end 15 of rocker arm 16 contacts the end of detector member 12. Thus, the action of either the free end 14 of detector member 12 against end 15 of rocker arm 16, or the free end of depressor member 13 against the other end 7 of rocker arm 16, causes shaft 17 to assume an angular position corresponding proportionally to the position of pointer 4, whether, immediately preceding this operation of the feeler mechanism, the end 15 of rocker arm 16 is above or below the vertical position to be assumed by the free end 14 of detector member 12 after each periodic operation of the feeler mechanism 20. This operation is continued periodically as cam 9 rotates, alternately, freeing pointer 4, then clamping it, detecting its position, and positioning rocker arm shaft 17 in angular correspondence to its position. Shaft 17 is frictionally supported between a resiliently mounted friction-creating thrust bearing 22 and an adjustable pivot bearing 19, so that it remains in its last succeeding position until the next periodic operation of the arms 11, 12 and 13. An arm 21 is attached to shaft 17 and thus is also positioned in correspondence to the position of needle 4. This arm 21 provides a connection to flapper member 5 of control couple 6 and it is also connected by a wire link 32 to the deviation recorder mechanism 2. A hole 23 is provided in end 15 of member 16, and a weight 24 is mounted on the other end 7 of member 16. Proper proportioning of the size of this hole 23 and the mass of weight 24 permits accurate counterbalancing of the flapper-moving mechanism including member 16, shaft 17, arm 21, pin 25, resilient connecting member 26, and flapper 5.

The deviation recorder mechanism 2 includes plate-like frame member 34 suitably supported in a vertical position on the frame or casing of the instrument. Frame member 34 has two forwardly extending arms 33 and 35 to support the pen moving mechanism, the strip chart drive mechanism, and a box-like frame portion 36 which supports the strip chart 54. Frame 36 is pivotally mounted at 98 to the base of the instrument case between the arms 33 and 35 in such a manner that it may be tipped forward to a readily accessible position for renewing the strip chart.

A U-shaped shaft 44 is pivotally mounted on frame 34 at a point 40 in the upper left-hand corner thereof and on the forward portion of arm 33 at a point 46 on the same horizontal axis as point 40. An arm 38 is rigidly attached to shaft 44 and extends therefrom on both sides of the pivot point 40. One end of arm 38 is connected to arm 21 of the controller mechanism 1 by wire link 32, and the other end is provided with a counterweight 42. An arm 48, extending downwardly, is also pivoted at 46 and is adjustably secured with respect to the U-shaped shaft 44 by an adjustment screw arrangement 50 whereby the angular position of arm 48 with respect to shaft 44 may be adjusted as desired. A horizontal crossbar or pen rack 52 extending across the front of the frame 36, is detachably pivoted to the lower extremities of lever 48 and a wire link 58 which depends, parallel to lever 48, from a point on arm 35 in the same horizontal plane as point 46. The detachable mounting of pen rack 52 is such that the rack is freely disengaged from the arm 48 by merely lifting the slot in crossbar 52 from its connection with a headed stud 49 provided in the end of the arm 48. Thus, the pen may be removed for cleaning purposes or for the purpose of renewing the chart without disturbing the control mechanism 1. A box type pen 56 is separably mounted at the center of pen rack 52 and this pen, thus supported, moves across the strip chart 54 in response to movement of the galvanometer needle 4 and thereby makes a record of such movement. Counterweight 42 is so designed and so mounted that the center of gravity of the movable linkage assembly is approximately in the axis of the pivot points 40 and 46 throughout its range of operative movement.

A lever 60, attached to cam 9 on drive shaft 8 at an off-center point 62, operates a pawl and ratchet member 64 to rotate a drive-shaft 66 mounted on arm 35 of frame 34. Drive shaft 66, through a worm-gear 68 and a pinion 70, rotates a shaft 72 mounted on the arm 35 and on an arm 37 extending parallel to arm 33 of frame 34 in suitable bearings 76 and 78, respectively. A floating shaft 88 is rotatably mounted parallel to shaft 72 on the arms of a U-shaped frame 90 across the base of the U. The ends of this frame 90 swing in suitable bearings on shaft 72 so that shaft 88 may oscillate about but always remain parallel to shaft 72; and a gear 80, mounted on shaft 72, always meshes with and drives a gear 84 secured to floating shaft 88. Two rubber drive rolls 86 are attached to shaft 88 and are pressed against the strip chart 54 wound upon a wind-up roll 116 by a spring 92, which spring is wound around a shaft 136 extending across frame 90 parallel to shafts 72 and 88. The ends of spring 92 react respectively against frame 34 and frame 90 so as to urge the drive rolls 86 upwardly against the surface of the strip chart on the wind-up roll 116. As the drive rolls 86 are rotated a certain number of revolutions in a given time interval, and as they always act on the surface of the chart, this arrangement drives the strip chart at a constant speed. In addition, the rubber drive rolls 86 are free to move gradually downward away from the axis of the wind-up roll 116 as the diameter of the roll increases as the strip chart is rolled thereupon without, however, interfering with the paper drive action.

A knurled knob 138 is provided on the forward end of drive shaft 66 to advance the strip chart 54 manually when desired.

The record strip frame 36 comprises two vertical parallel guide plates 94 and 96 spaced apart by suitable separation members a distance equal to the width of the strip chart 54 so that these plates act as guides to keep the strip chart in alignment as it advances past the pen 56. This frame 36 is pivotally attached at points 98 near the lower forward corners of side plates 94 and 96 to a U-shaped member 100 attached to the base of the instrument case so that frame 36 may be swung out away from the rubber drive rolls 86 for ready access when replacing the chart. The strip chart feed roll 104 rests in a V-shaped trough or plate 102 which extends between the two plates 94 and 96 at the bottom of the frame. The record strip 54 is drawn from the feed roll 104 up the front of the frame 36 over a flat plate 106 and onto the wind-up roll 116, as is shown in Figure 3. The angle between the sides of trough 102 is sufficient to prevent the feed roll 104 from rolling out of the frame 36 as the record strip unwinds and to provide sufficient friction to prevent it from unwinding except when pulled by rotation of the wind-up roll 116.

The plate 106 extends across the front of the frame 36 between the side plates 94 and 96 and forms a support behind the strip chart 54 to keep it flat so that the pen will operate properly, and also so that manual inscriptions may be made on the chart if desired. This plate is pivotally mounted at 108 near its upper end to the two side plates 94 and 96 and it extends downward almost to the bottom plate 102 leaving only a relatively narrow slot therebetween through which the strip chart is drawn so as to keep the strip chart feed roll in position and prevent it from being carried forward out of the frame 36 as the strip chart unwinds. To insert a new feed roll the bottom of plate 106 is pulled forwardly. Stops 110 limit its backward motion. The frame 36 is also provided with two latching levers 118 pivoted to the side plates 94 and 96 by pivot pins 120 and having hooks 122 at their rearward ends to engage the frame member 34 to hold the record strip frame 36 in operative position. The wind-up roll 116 is provided with axles 112 which are inserted in slots 114 in the side plates 94 and 96 to rotatably support the roll 116 in its operating position so that it is firmly pressed against the drive roll 86 when frame 36 is latched in position by means of levers 118.

As it frequently happens the different rolls of strip chart paper vary slightly in width, an adjustment spacing rod, generally indicated at 124, is provided to vary the spacing between the two guide plates 94 and 96. This member, shown in detail in Figure 4, comprises a rod 126 extending from plate 96 through plate 94 and provided at one end with a pivot pin 128 journalled in a suitable bearing in plate 96, and an enlarged portion 130 near the other end threaded through a collar 132 attached to plate 94. A knurled knob 134 is mounted on the end of rod 126 extending through plate 94 whereby it may be rotated to advance the threaded portion 130 through collar 132 and thereby to adjust the space between plates 94 and 96. The method used for making this adjustment when installing a new roll is to place the new roll in the position of wind-up roll 116 and adjust the spacing rod 124 until the roll is lightly clamped between the guide plates 94 and 96. After this adjustment is made the new roll is placed in trough 102, the wind-up roll replaced in slots 114, and the new strip chart threaded through the slot between trough 102 and plate 106, over plate 106 and attached to wind-up roll 116. With the spacing of the guide plates thus adjusted the strip chart will track satisfactorily.

As many embodiments may be made in the above invention and as many changes may be made in the embodiment above described, it is to be understood that all matter hereinbefore set forth as shown in the accompanying drawings is to be interpreted as illustrative only and not in a limiting sense.

I claim:

1. In apparatus for recording the deviation of a meter element from a control point, in combination, a rotatable member, means for transmitting the position of the meter element to said member to cause it to assume positions of rotation corresponding to positions of deviation of the meter element, an effective bell crank pivoted about an axis below and parallel to the axis of rotation of said rotatable member and having a first arm mechanically connected to said member, having a second arm extending downwardly, a link dependent from a point in approximately the same horizontal plane as the axis about which said bell crank rotates but laterally displaced therefrom, a pen rack swung from said second arm and said link, said bell crank and link being freely suspended in journals, and the connections between the bell crank and the rotatable member and between the bell crank, the link and the pen rack being maintained substantially balanced whereby the pen rack is free to follow the movement of said rotatable member.

2. In apparatus for recording the position of a condition responsive element, in combination, a pivoted control member, means for transmitting the position of the condition responsive element to said control member to cause said member to assume angular positions corresponding to positions of said element, a lever freely pivoted about a horizontal axis and having a driving arm driven by said control member and a long arm extending downwardly, a link pivoted about an axis laterally displaced from and in approximately the same horizontal plane as the axis of said lever, a pen support hung between said long arm and said link, said lever and link being freely suspended in journals, and the gravitational forces acting on the connections between the lever and the control member, and between the lever, the link and the pen support being substantially balanced whereby the pen support is free to follow the movement of said control member.

3. In apparatus for recording the position of a condition responsive element, in combination, a pivoted control member, means for transmitting the position of the condition responsive element to said control member to cause said member to assume angular positions corresponding to the positions of said element, an effective crank freely pivoted about a horizontal axis and having a driving arm and a long arm extending downwardly, said driving arm being driven by said control member through a first link, a second link pivoted about an axis laterally displaced from and in approximately the same horizontal plane as the axis of said crank, a pen support swung between said long arm and said second link whereby the pen support is free to follow the movement of said control member, and means to balance said effective crank and the parts connected therewith so that their center of gravity remains approximately at the axis of rotation throughout the range of operative movement.

4. In apparatus for recording the position of a condition responsive element, in combination, a pivoted control member, means for transmitting the position of the condition responsive element to said control member to cause said member to assume angular positions corresponding to the positions of said element, a lever having three arms freely pivoted about a horizontal axis, the first arm of said lever being driven by said control member through a first link, said second arm being long and extending downwardly, said third arm extending from the axis of said lever away from said first and second arms, a second link pivoted about an axis laterally displaced from and in approximately the same horizontal plane as the axis of said lever, a pen support hung between said second arm and said second link whereby the pen support is free to follow the movement of said control member, and a mass attached to said third arm to balance said lever and the parts connected therewith so that the center of gravity thereof remains approximately at the axis of rotation throughout the range of operative movement.

CUTHBERT J. BROWN.